(12) United States Patent
Tromp (10) Patent No.: US 8,714,583 B2
(45) Date of Patent: May 6, 2014

(54) INTERIOR PANEL PART WITH AIRBAG COVER

(75) Inventor: Stefan Tromp, Illingen (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 0 days.

(21) Appl. No.: 13/481,427

(22) Filed: May 25, 2012

(65) Prior Publication Data

US 2013/0134693 A1 May 30, 2013

(30) Foreign Application Priority Data

May 26, 2011 (DE) .......................... 10 2011 102 521

(51) Int. Cl.
*B60R 21/215* (2011.01)
*B60R 21/216* (2011.01)

(52) U.S. Cl.
USPC ................................... 280/728.3; 280/743.2

(58) Field of Classification Search
USPC ................................... 280/727, 728.3, 743.2
See application file for complete search history.

(56) References Cited

U.S. PATENT DOCUMENTS

| | | | | |
|---|---|---|---|---|
| 5,393,089 A | * | 2/1995 | Pakulsky et al. | 280/728.3 |
| 6,378,894 B1 | * | 4/2002 | Trevino et al. | 280/728.3 |
| 6,595,543 B2 | * | 7/2003 | Desprez | 280/728.3 |
| 7,234,726 B2 | * | 6/2007 | Trevino et al. | 280/728.3 |
| 7,291,301 B2 | | 11/2007 | Cowelchuk et al. | |
| 2010/0109297 A1 | * | 5/2010 | Mazzocchi et al. | 280/728.2 |
| 2011/0109067 A1 | * | 5/2011 | Le Hoang et al. | 280/728.3 |

FOREIGN PATENT DOCUMENTS

| | | |
|---|---|---|
| DE | 4315853 | 11/1994 |
| DE | 19530346 | 2/1996 |
| DE | 19935625 | 2/2001 |
| DE | 102008019950 | 10/2009 |

* cited by examiner

*Primary Examiner* — Paul N Dickson
*Assistant Examiner* — Darlene P Condra
(74) *Attorney, Agent, or Firm* — Reising Ethington P.C.

(57) ABSTRACT

An interior panel for the interior of a vehicle and a method for the production thereof. The interior panel has first and second layers and with the first layer having an air bag cover region extending over an air bag opening in the second layer. The interior panel has a connecting part which is formed from: a first fastening section which is fastened to the airbag cover region of the first layer, a second fastening section which is fastened to the lower side of the second layer, and a coupling section situated between the first fastening section and the second fastening section. The coupling section is made of flexible material such that the airbag cover region may be partially separated from the first layer during airbag deployment while being held by the coupling section.

14 Claims, 6 Drawing Sheets

INTERIOR PANEL PART WITH AIRBAG COVER

This application claims the benefit of the filing date of German Patent Application No. DE 10 2011 102 521.2, filed on May 26, 2011, the entire disclosure of which application is hereby incorporated herein by reference.

TECHNICAL FIELD

The present invention relates to an interior panel part for a vehicle and in particular an interior panel part with an airbag cover region for covering a passage opening of the airbag of an airbag device and a method for the production of the interior panel part.

BACKGROUND OF THE INVENTION

Interior panels are known from the prior art, in particular as instrument panels, which can be provided at suitable sites—on the passenger side in the case of the instrument panel—with an airbag flap. Usually, these interior panels or respectively instrument panels have several layers with a different function: a support layer, which can be provided with an intermediate layer, which is applied on the support layer, and a decorative layer, which is mounted on the visible side of the intermediate layer, facing the passenger compartment. The airbag flap is frequently formed by the support-, the intermediate- and the decorative layer, wherein weakenings are provided on the side facing away from the visible side, which usually follow the outline of the airbag flap.

In order to prevent a tearing off of the airbag flap on the expanding of the airbag, usually rebound straps are used, which are connected in a form- or force-fitting manner on the one hand with the cover of the airbag passage opening and on the other hand with the instrument panel. In the prior art, woven or knitted fabrics, constructed in the manner of a net, are frequently used, as known from DE 20 2007 016 718 U1. These flexible connecting structures of a woven or knitted fabric act in the installed state in the instrument panel in a similar manner to a film hinge and can prevent a tearing off of the cover.

DE 195 30 243 A1 and DE 10 2008 019 950 A1 show examples of application of rebound straps for securing an airbag flap on a steering wheel hub or respectively on an instrument panel.

SUMMARY OF THE INVENTION

It is an object of the present invention to provide an interior panel part with an airbag cover region for a vehicle, which is able to be produced inexpensively and nevertheless functions reliably.

In particular, it is an object of the present invention to provide a method for the production of an interior panel part according to the invention with an airbag cover region, which is favorably priced and nevertheless reliable.

With the interior panel part according to the invention, advantageously a flexible connecting part can be mounted on the one hand in a section of the instrument panel and on the other hand in an airbag cover region, covering a passage opening, beneath a possible decorative layer and support layer. In the prior art, it is usual to arrange the flexible connecting part between a decorative layer and a support layer. If, in such an arrangement of the connecting part, the cover is now pushed open by the airbag, the forces which occur are transferred directly to the connecting site between the decorative layer and the support layer of the connecting part. It can arise that owing to the forces which occur, the connection between the decorative layer and the support layer tears open. This tearing open damages the instrument panel generally so intensively that a repair and an exchanging of only the airbag flap is not worthwhile, but rather the entire interior panel frequently has to be exchanged. In particular in the case of instrument panels, depending on the decorative materials used, this can be correspondingly expensive and laborious. In addition, through the tearing open of the decorative layer and of the support layer, also the fabric connecting structure forming the film hinge can be detached and, together with the airbag cover, can be separated from the instrument panel through the forces of the expanding airbag which occur, whereby in turn the risk of injury increases. With the advantageous embedding of the flexible connecting part on the one hand on the airbag cover and on the other hand beneath a supporting structure, the advantage is produced that no additional fastening means, such as fastening strips, are necessary on the airbag cover region etc., which increase the mass of the airbag cover. Through the smaller mass of the airbag cover, the risk of a tearing off of the airbag cover from the instrument panel in the case of an airbag expansion is limited. The smaller mass also brings about a lower mass moment of inertia, whereby smaller forces act on the interior panel part in the case of an airbag expansion, so that the interior panel part must be constructed so as to be less rigid, the latter therefore has less weight, which as a whole has a positive effect on the overall weight of the vehicle and the production of the interior panel part, which can also mean lower material costs and a lower fuel consumption in motor vehicles.

The embedding of the fastening section, provided on the connecting part, preferably takes place by an injection molding method. With injection molding methods, it is possible to produce a sufficient force-fitting and form-fitting connection between the flexible connecting part and the airbag cover.

In an advantageous embodiment, the connecting part is a netlike woven fabric or knitted fabric. This has the advantage that, as already mentioned above, a sufficiently secure and nevertheless light and tear-proof connection is formed between the cover and the instrument panel. The woven or respectively knitted fabrics can be produced from various yarns or fibers, which have various strengths according to the stress and arrangement. For example, in the basic structure of the connecting part, tear-proof fibers or yarns can be integrated accordingly.

According to an embodiment of the interior panel part according to the invention for the interior of a vehicle, the interior panel part has a first layer facing a first side and a second layer which is fastened to the first layer with a lower side, which faces a second side situated opposed to the first side, and which has an encircling margin region and an airbag passage opening defined through this, wherein the first layer has a main region and an airbag cover region covering the passage opening and is embodied such that the airbag cover region is able to be at least partially separated from the main region by an airbag expanding from the second side, wherein the interior panel part has a connecting part which is formed from: a first fastening section, which is fastened to the airbag cover region of the first layer, a second fastening section, which is fastened to the lower side of the second layer, and a coupling section situated between the first fastening section and the second fastening section, which coupling section is made from flexible material and is designed such that the airbag cover region, after its at least partial separation from the main region, is held by the coupling section.

The first layer is preferably constructed as a support layer. However, it is also possible that the second layer is also at least partially constructed as a support layer. In addition, the first and the second layer can be constructed such that they function as a support layer in the state when mounted on one another. The airbag or respectively the airbag device is situated in the original position on the side of the second layer. Through the configuration of the interior panel component from two layers, advantageously particularly complicated, nested and/or undercut interior panel components can be produced. In addition, through the configuration of the interior panel component from two layers, the result is that in the region of the airbag cover only one layer needs to be provided, which has the advantage that the airbag cover has a lower weight than multi-layered airbag covers. In the case of the tearing open of the airbag cover by an expanding airbag, owing to the lower weight a fastening of the airbag cover on the main region, in particular on the second layer can be embodied in a less extensive manner, which in turn can mean a reduction in material and weight. In addition, through the arrangement of the connecting part on the lower side of the second layer, the advantage is produced that the forces acting on the connecting part in the case of an airbag expansion can be conveyed in a particularly favorable manner to the interior panel component, without additional measures being necessary for reinforcing the component.

According to an embodiment of the interior panel part in accordance with the invention, the first fastening section and the second fastening section of the connecting part are spaced apart from one another such that the coupling section between the two fastening sections is constructed as an exposed section, in particular a loop. This has the advantage that the airbag cover region has a sufficient clearance to flap open when an airbag expansion occurs, without the airbag cover being able to impede the expansion of the airbag. Nevertheless, it is ensured that the airbag cover region is fastened sufficiently securely to the second layer of the interior panel part by the connecting part.

According to another embodiment according to the invention of the interior panel part, the first fastening section and the second fastening section are spaced apart from one another such that the coupling section is constructed as a film joint or hinge joint, wherein the first fastening section adjoins the margin region with a margin section. This has the advantage that too intensive a swinging open or respectively springing away of the airbag cover can be prevented, in particular when the installation space which is available or the passenger compartment sets limits for the folding open of the airbag cover. In addition, with the film joint the expansion direction of the air bag can be partly controlled.

According to another embodiment according to the invention of the interior panel part, the second fastening section of the flexible connecting part is embedded in a fastening strip which is mounted on the second layer. This has the advantage that the connecting part can be fastened better to the second layer, so that the most suitable material can be selected for the function of the connecting part.

According to a further embodiment according to the invention of the interior panel part, the fastening strip is provided with a first coupling device and the first layer is provided with a second coupling device, corresponding thereto, for the detachable, force-fitting and/or form-fitting coupling with one another of the fastening strip on the first layer. A coupling device is to be understood herein to mean a device which permits a non-destructive mounting of the fastening strip on the first layer. Preferably, the coupling device is embodied as a plug/bush connection, provided with a press fit. This non-destructive mounting has the advantage that no additional measures are necessary for the mounting of the fastening strip on the first layer, which permits a quicker production.

According to an embodiment according to the invention of the interior panel part, the first coupling device of the fastening strip is a plug device and the second coupling device of the first layer is a plug mount device, or vice versa, which together form a detachable press fit. The coupling device can, however, also be embodied as a tongue-and-groove connection, so that a lateral pushing of the fastening strip on the first layer is possible. It is essential here that the mounting of the fastening strip on the first layer permits a non-destructive dismantling and the mounting is sufficiently secure that the fastening strip, on the subsequent fastening and/or joining method cannot become separated from the first layer.

In an embodiment according to the invention of the interior panel part, the plug device is constructed as plug-in pins or plug-in strips, which are arranged in series, linearly, parallel and/or offset with respect to one another, with the plug mount devices being provided in corresponding positions. The position of the plug-in pins or plug-in strips and their corresponding plug mount devices are not limited to the positions mentioned above. Rather, the positions are to be selected so that always an optimum fastening of the fastening strip on the first layer is possible.

According to an embodiment according to the invention of the interior panel part, the flexible connecting part is formed from a netlike woven or knitted fabric, which has a sufficient resistance to tearing. The connecting part which connects the airbag cover region with the second layer has the function of a rebound strap, which is intended to prevent a tearing off of the airbag cover region which is pushed open by the expanding airbag. The connecting part can be produced entirely from a woven or knitted fabric, but also from any other material which is suitable as a rebound strap. The connecting part can, however, also consist of flexible and non-flexible sections, in particular at the fastening sections of the connecting part situated at the end sections.

According to an embodiment in accordance with the invention of the interior panel part, the first layer is provided to the side of the airbag cover region with a first assembly region for mounting with the second layer, wherein the second layer on the margin region to the airbag passage opening has a second assembly region complementary to the first assembly region of the first layer. The assembly region of the first and the second layer is preferably constructed such that the region is suitable for an ultrasonic vibration welding.

In an embodiment according to the invention of the interior panel part, the first assembly region of the first layer is constructed as a first sequence of a groove and a web, and the second assembly region of the second layer is formed with a second sequence of a groove and a web, which are arranged offset with respect to one another such that a groove of the one layer is associated with a web of the other layer. This offset arrangement has the advantage that grooves and webs, constructed so as to be complementary to one another, permit a precise positioning of the one layer on the other layer.

In an embodiment according to the invention of the interior panel part, the margin region of the passage opening for the airbag of the airbag device is reinforced with a reinforcing rib. This has the advantage that the forces which are conveyed from the connecting part to the margin region, which are caused by the expanding airbag, can be better conveyed to the second layer.

In an embodiment according to the invention of the interior panel part, the fastening strip is mounted on the reinforcing rib. This has the advantage that no further fastening measures are necessary on the second layer.

In an embodiment according to the invention of the interior panel part, the first and second layers are made from a plastic material. As plastic materials, all materials are conceivable which are suitable as interior panel part in vehicle construction, such as for example TPO, ASA, ABS, PVC, etc.

In an embodiment according to the invention of the interior panel part, the airbag cover region is defined at least partially by a material weakening in the first layer. The material weakening is only necessary if the airbag cover region is produced from a material which is too rigid to automatically hinge on actuation of the airbag (defined according to opening geometry and opening speed).

In a method according to the invention for the production of an interior panel part for the interior of a vehicle, for an interior panel part with a first layer facing a first side and with a second layer which is fastened to the first layer with a lower side, which faces a second side situated opposed to the first side, and which has an encircling margin region and an airbag passage opening defined thereby, wherein the first layer has a main region and an airbag cover region covering the passage opening and is embodied such that the airbag cover region is able to be at least partially separated from the main region by an airbag expanding from the second side, the following steps are carried out for producing the above-mentioned interior panel part: inserting a flexible connecting part into a mold; mounting a section of the first layer of the interior panel part on a first fastening section of the flexible connecting part and mounting a fastening strip on the second fastening section of the flexible connecting part by means of the mold; and removing from the mold the flexible connecting part together with the first layer of the interior panel part mounted on its one fastening sections and of the fastening strip mounted on its other fastening section. The fastening strip is firstly coupled on the first layer detachably such that the first layer can be permanently connected together with the second layer at predetermined assembly regions by means of an assembly method. The mounting of the fastening strip on the first layer has the advantage that the fastening strip cannot have an intrusive effect in the subsequent method steps, such as for example being able to arrive into the assembly regions of the first and second layer.

In a method according to the invention, the fastening strip is mounted on the first layer by means of a detachable non-destructive coupling, such as in particular an adhesive connection or a detent connection, wherein the coupling is sufficiently secure so that the fastening strip cannot become detached in a subsequent assembly method. On coupling of the first layer to the second layer, preferably connections are selected which permit a quick but non-destructive and temporary mounting of the fastening strip on the first layer.

In a method according to the invention, a protective cap is mounted to protect the fastening strip and the flexible connecting structure. The protective cap is intended to protect the fastening strip and the connecting part from the negative influences of the fastening- and joining methods, which are used for the permanent fastening of the first layer to the second layer.

In a method according to the invention, the first layer is arranged on the second layer of the interior panel part one over the other such that the first and the second layer can be connected with one another at their assembly regions by means of an assembly method, such as vibration welding, ultrasonic welding, heated tool welding, infra-red welding, hot gas welding, spot welding, friction welding, high frequency welding, circular welding, laser beam welding, in particular a joining method which is suitable for the permanent connecting of plastics. The fastening of the first layer to the second layer can, however, also be carried out by other joining and fastening methods. It is essential here that the first and the second layer are connected sufficiently securely and permanently with one another.

In a method according to the invention, the fastening strip is connected with the second layer by means of a joining method and/or by means of a screwing- or detent method. As joining methods here inter alia ultrasonic riveting methods are conceivable. However, the fastening- and joining methods can also be used, which are able to be applied for the permanent fastening of the first and second layer. In screwing or detent methods, the advantage exists that a simpler subsequent dismantling is possible, for example in order to be able to better recycle the material of the interior panel part which is used.

In a method according to the invention, the fastening strip is mounted on a side of the second layer which is opposed to the side of the assembly regions of the second layer.

In a step of the method according to the invention, the first layer is weakened at least in parts along an edging of the airbag cover region, preferably by laser irradiation. The material weakening of the first layer can take place before or after the mounting of the second layer. Other methods suitable for material weakening can also be used, such as cutting, scoring, stamping or melting. It is essential that the material weakening is embodied such that an expanding airbag can push open the airbag cover region. When the material forming the airbag cover region is sufficiently rigid, such a weakening can be dispensed with, when the expanding airbag can push open the airbag cover region of this material without limitations to safety being hereby brought about.

BRIEF DESCRIPTION OF THE DRAWINGS

Further advantages, features and details of the invention will emerge from the following description of a preferred example embodiment and with the aid of the drawings, which show in.

DETAILED DESCRIPTION OF THE ILLUSTRATED EMBODIMENTS

Figure 1:
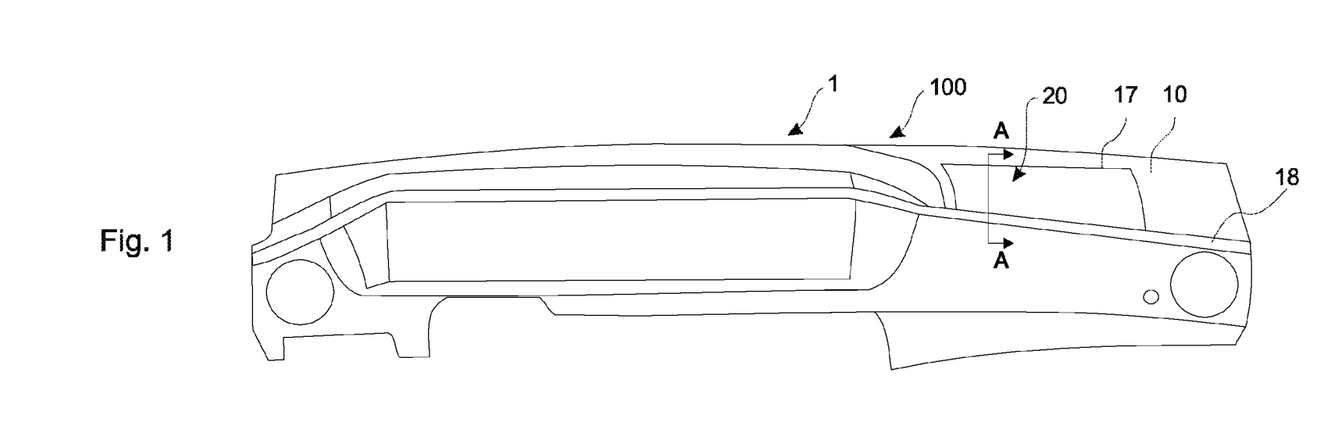
FIG. 1 is a diagrammatic view of an interior panel part according to the invention with an airbag cover region.

According to the invention, generally an interior panel part of a vehicle is provided with a passage opening 50 for an airbag of an airbag device 60 to pass through from an airbag chamber in the interior of the vehicle, arranged beneath the panel part, from the viewpoint of the occupant. In FIG. 1 an instrument panel is provided as an embodiment of the interior panel part 1 according to the invention. According to the invention, the interior panel part can also be a different interior panel part, e.g. an interior panel part for the side of the vehicle interior, e.g. for the covering and passing through of a side airbag. Generally, the concern is therefore with an interior panel part with a passage opening 50 for the airbag of an airbag device 60, which is able to be covered by the interior panel part.

In FIG. 1 a diagrammatic view is illustrated of an interior panel part 1 according to the invention, with a first layer 10 and a second layer 30. The first layer 10 is formed from a main region 100 and an airbag cover region 20. The airbag cover region 20 is delimited in the embodiment illustrated in FIG. 1 by an edging region 17 of the main region 100. The edging region 17 can be embodied so as to be visible from the exterior, i.e. from a visible side or first side 51, or so as to be non-visible. In the intended installation of the panel part, the first side 1 is the interior of the vehicle. The main region 100 is provided on its lower side, which faces a second side S2, situated opposed to the first side, with a second layer 30 and is connected in a laminar manner therewith.

The edging section 17 runs externally around an airbag cover or an airbag covering, so that the edging region 17 is situated outside the embodiment, illustrated in FIG. 1, of an optionally provided material weakening line 13 in the interior panel part 1. The material weakening 13 is embodied such that an expanding airbag can push open the airbag cover region 20. The first layer 10 can also be realized without a material weakening 13 or an only partially formed and therefore not encircling weakening line, when the material from which the instrument panel 1 or respectively the airbag cover region is formed has a rigidity at which an expanding airbag can reliably push through this region. In FIG. 1 a first layer 10 of the instrument panel is shown. In the illustrated embodiment, the first layer 10 has on the side S1 facing the passenger compartment a decorative seam mount 18, which is provided for a decorative seam (not illustrated) of a decorative layer. The first layer 10 can be laminated with a decorative layer (not illustrated).

Figure 2:
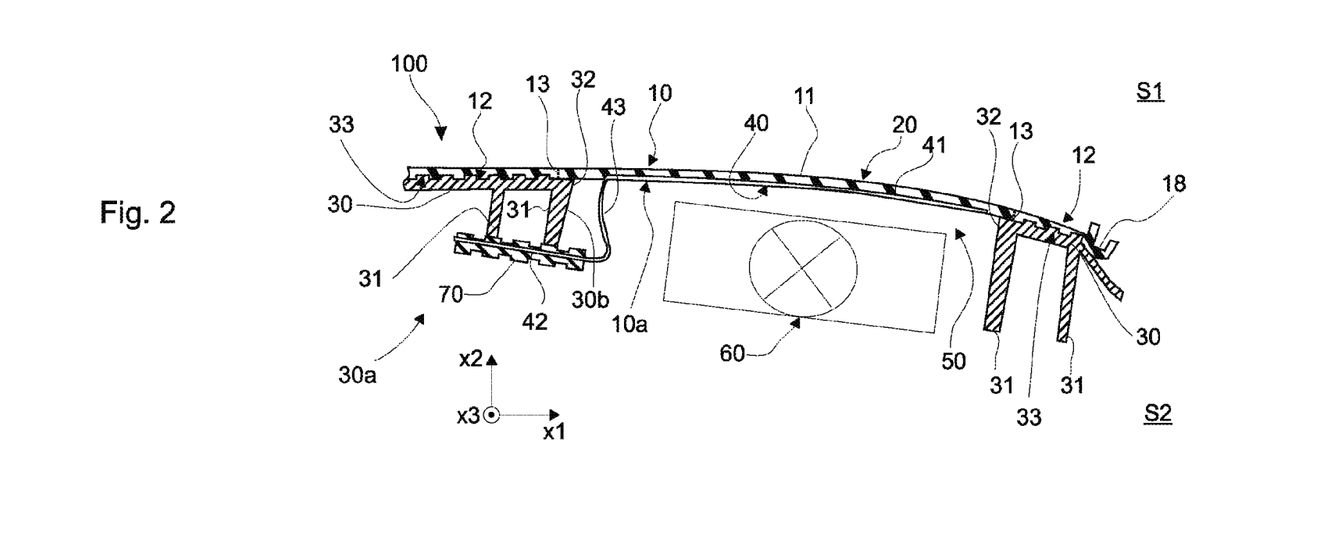
FIG. 2 is a diagrammatic sectional view of the interior panel part according to the invention according to section A-A in FIG. 1, wherein the relative position of the interior panel part to an airbag device and a fastening strip for a flexible connecting part is illustrated in the final assembly state thereof.

In FIG. 2 a diagrammatic sectional view is illustrated according to the cross-section A-A in FIG. 1 of the interior panel part 1 according to the invention, without a decorative layer with an airbag device 60, the outer side of which faces a first side, which in relation to the interior panel part 1 is situated opposed to a second side S2 which faces away from the passenger compartment. The visible side S1 or outer side corresponds to the side of the instrument panel illustrated in FIG. 1, which faces the passenger compartment of a motor vehicle, when the interior panel part 1 is installed in a vehicle. On the second side 2 therefore substantially all the structural elements are arranged, which are to be covered by the interior panel part 1, such as for example an airbag device 60.

On the cover region lower side 10a of the first interior panel part layer 10, facing the second side S2, a flexible connecting part 40 is fastened such that the latter connects the main part 100 and the cover region 20, in order to prevent a complete separation of the airbag cover region 20 from the main part 100 by an expanding airbag. The flexible connecting part 40 has: a first fastening section 41, which is mounted on the cover region lower side 10a of the cover region 20, a second fastening section 42, which is mounted via a fastening strip 70 on the lower side 30a of the second layer 30, and a coupling section 43, which is arranged between the first fastening section 41 and the second fastening section 42 and connects the two fastening sections 41 and 42 with one another such that a tearing off of the airbag cover region 20 from the main part of the interior panel part 1 by an expanding airbag is prevented on the side at which the airbag cover region is connected with the flexible connecting part 40. The first fastening section 41 of the flexible connecting part 40 is mounted on the side of the visible layer 10 which faces the inner side S2.

The fastening strip 70 in the embodiment shown in FIG. 1 is preferably mounted on the fastening section 42 in an injection molding method, wherein the fastening strip 70 embraces the second fastening section 42 of the flexible connecting part 40 in the longitudinal and width direction completely or over a predetermined length.

The interior panel part 2 shown in FIGS. 1 and 2 has substantially two layers: a first layer 10 and a second layer 30. The first layer 10 has the main part 100, which is fastened to the second layer 30, provided as supporting, and a cover region 11, which forms the airbag cover region 20 and covers a passage opening 50 for an expanding airbag of an airbag device 60. The two layers 10, 30 form together the non-laminated base of an interior panel part 1. The interior panel part 1 of the embodiment shown herein, has a complicated geometry, owing to the broken-out sections for the ventilation openings and the accommodation for the instrument display and further design-related specifications, which geometry is difficult to be able to produce in a single injection molding step. Therefore, the interior panel part 1 illustrated in FIG. 1 is preferably formed from a first layer 10 and a second layer 30, which are connected with one another in a joining or fastening method.

Advantageously, the two layers 10, 30 are formed from plastics, wherein the two layers are preferably produced respectively individually in a separate injection molding or pressing method. The first layer 10 and the second layer 30 are then fastened to one another in a fastening or joining method according to the invention, explained herein below. The selected plastics must be accordingly suitable for the selected fastening or respectively joining method.

Preferably, when the two layers 10, 30 are connected with one another, an additional third layer (not illustrated) is mounted on the upper side of the side of the first layer 10 facing the visible side S1. This additional layer is a lamination layer or decorative layer, which can consist of plastic, leather or a similar material or fabric which is suitable for the configuring of the passenger compartment of a vehicle. The third (not illustrated) layer can consist of two plies. The first ply, which adjoins the first layer 10, can consist of a knitted fabric, woven fabric or a foam layer, and the second ply, which faces the visible side S1 and is arranged on the first ply, can consist for example of leather or of a slush skin of plastic. The decorative layer can, however, also consist of other single-layered, double-layered or multi-layered materials suitable for vehicle construction.

In the embodiment illustrated in FIG. 2, in addition on the visible side S1 of the instrument panel 1, facing the passenger and the driver, on the first layer 10 a decorative seam mount 18 is provided to receive a decorative seam or decorative strip of decorative layers, which have such a decorative seam or decorative strip. The decorative seam mount 18 is necessary in particular when a decorative layer with a decorative or functional seam is mounted on the first layer 10 on the visible side S1. In particular when on the first layer 10 a so-called slush skin of plastic or another decorative layer without a decorative seam is applied, the interior panel part 1 can be formed without decorative seams or decorative strips. In this case, the decorative seam mount 18 is dispensed with.

As illustrated in FIG. 2, the airbag cover region 20 covers a passage opening 50, constructed in the second layer 30, for an airbag of an airbag device 60 to pass through. The main part 100 of the first layer 10 has an assembly region 12 which adjoins the airbag cover region 20 and is situated to the side of the passage opening 50. At the section of the first layer 10, to which the airbag cover region 20 and the main region 100 adjoin, a material weakening 13 is provided, which is formed laterally from the margin region 32 of the second layer 30 defining the passage opening 50. The material weakening 13 of the first layer 10 can run partially or completely within the passage opening 50 or outside it. Preferably, the course of the material weakening 13 corresponds to the course of the edging 17 of the airbag cover region 20, as indicated in FIG. 17.

The interior panel part 1 shown in FIG. 1 is constructed as a so-called U-flap system. This means that there is only one flap or respectively the airbag cover region has only one pivot region. In this case, the material weakening 13, which is intended to permit a tearing open of the airbag cover region 20 by an expanding airbag, is constructed with a U-shaped course in the surface of the interior panel part 1 facing away from the visible region, or respectively of the airbag cover region 20. The pivot region of the flap is then the region where the flexible connecting part 40 is also arranged. In FIG. 2 a material weakening 13 is also indicated at the pivot site of the airbag cover region on the margin region 32, which material weakening is formed so as to be less intensive than the opposite material weakening 13, so that a type of hinge is formed there.

It is, however, also possible to construct the interior panel part 1 according to the invention as an H-flap or multiple-flap system. This means that there are at least two flaps or respectively two pivot sites at which the flaps can pivot open. The course of the material weakening 13, which is intended to permit a tearing open of the airbag cover region 20 by an expanding airbag, is then H-shaped. In an H-flap system, flexible connecting parts 40 are respectively provided at the respective pivot sites. The flexible connecting parts 40 are then provided respectively with a fastening strip 70 for fastening to the reinforcing ribs 31 to the left and right of the airbag device 60, viewed in x1 direction. It is, however, also conceivable that with several flexible connecting parts 70 before the assembly on the reinforcing ribs 31 firstly a shared fastening strip 70 is present, which is divided into individual fastening strips 70 for the assembly on the reinforcing ribs 31.

The material weakening 13 is necessary when the expansion force of the expanding airbag is not sufficient to tear open the airbag cover region 20 such that owing to the material characteristics of the layers covering the passage opening 50—for example too great an elasticity, too great a rigidity—a proper functioning of the airbag cannot be guaranteed.

Figure 7:
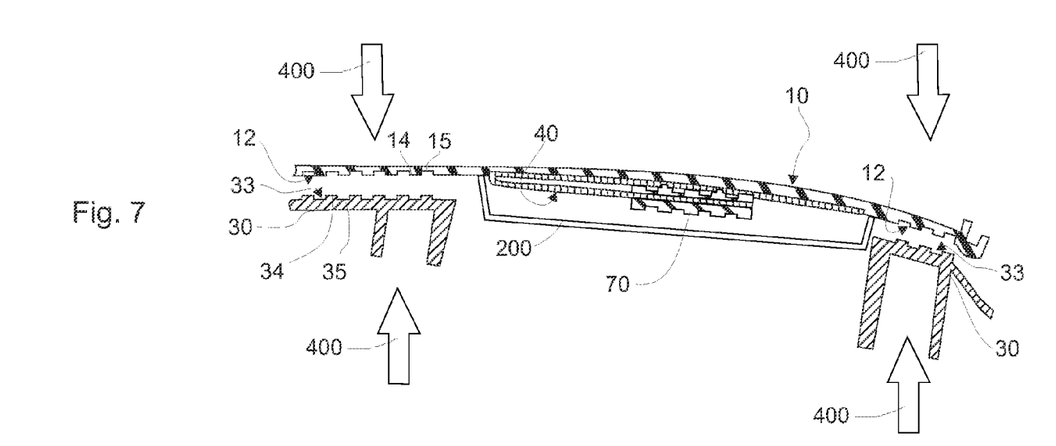
FIG. 7 is a diagrammatic view of the first and second layer, illustrated in FIGS. 3 and 4, of the interior panel part according to the invention, wherein the two layers are not yet assembled with one another, but rather a first step of the assembly of the first layer with the second layer is illustrated diagrammatically.

The assembly region 12 or joining region of the first layer 10 preferably has a toothing of a sequence of webs 14 and grooves 15 (see FIG. 7).

On the cover region lower side 10a of the first layer 10, a second layer 30 is provided adjoining the passage opening 50, which second layer is fastened via a joining region or a second assembly region 33 of the second layer 30 with the assembly region 12 of the first layer 10 in a form- and/or force-fitting manner. The second assembly region 33 of the second layer 30 is constructed in a complementary manner to the first assembly region 12 with a sequence of webs 34 and grooves 35 (see FIG. 7), so that the two regions can be fastened to one another by a suitable fastening or joining method, such as for example vibration welding. The assembly regions 12 and 33 of the first layer 10 and of the second layer 30 can, however, also have a different design. It is only essential here that they are suitable for the selected joining or fastening method for fastening the first layer 10 to the second layer 30.

The construction of the assembly regions 21, 33 illustrated in FIG. 7 is particularly well suited for a vibration welding method for fastening the first layer 10 to the second layer 30. However, other embodiments of the assembly regions 21, 33 are also possible. For example, the assembly regions 21, 33 can be constructed in accordance with a dovetail joint for the construction of a form-fitting connection, similar to a tongue-and-groove connection, which are then connected with one another permanently in a subsequent fastening method.

The second layer 30 in this embodiment is the supporting layer and has the task of giving the instrument panel a sufficient stability. The margin region 32, which defines the passage opening 50 for an expanding airbag is also formed by the second layer 30 or supporting layer.

The margin region 32 of the second layer 30 preferably follows the course of the edging 17 and is provided with a reinforcement. In the embodiment of the interior panel part 1 shown in FIG. 2, the reinforcement is formed from reinforcing ribs 31 which are arranged in pairs on the margin region 32 of the second layer 30 and extend away from a lower side 30a of the second layer 30 towards the inner side S2. The lower side 30a is the side of the second layer 30 which faces away from the assembly region 33 of the second layer 30, as also shown in FIG. 2. The reinforcement of the margin region at the passage opening 50 can, however, also be achieved by different reinforcing measures, such as inlays of metal or plastic regions with increased stability or with an individual reinforcing accretion 31. The reinforcement is preferably arranged encircling on the margin region 32 of the passage opening. However, it is also conceivable that the reinforcement is provided only partially encircling at the sites which are exposed to higher stresses. This has the advantage that a saving can be made on material and therefore the interior panel part 1 as a whole can be constructed so as to save more material and to be lighter.

As illustrated in FIG. 2, in an embodiment according to the invention the flexible connecting part 40 has a first fastening section 41, a second fastening section 42 and a coupling section 43 formed between the first fastening section 41 and the second fastening section. The first fastening section 41 of the flexible connecting part is mounted by means of an injection molding method on the cover region lower side 10*a* of the airbag cover region 20 and is embedded therein accordingly. It is, however, also possible to fasten the fastening section 41 by means of a suitable adhesive method to the airbag cover region 20 which is provided for this. It is essential here that in the mounting method the mass or respectively the weight of the airbag cover region 20 is not substantially increased. A greater mass or respectively a greater weight leads to a greater mass moment of inertia, which in turn on striking out of the airbag cover region must be conveyed into the adjoining region of the interior panel part 1, which in turn requires a greater rigidity of these regions. A lower mass moment of inertia or respectively a smaller mass of the airbag cover region namely means that the corresponding interior panel part 1 must be constructed so as to be less rigid, that the latter therefore has less weight, which as a whole has a positive effect on the overall weight of the vehicle and the production of the instrument panel, wherein in addition, as a secondary effect, fewer material costs are incurred. The lower weight of the interior panel part 1 and the weight reduction of the overall weight of the vehicle connected therewith can, in addition, lead to a lower fuel consumption. Screw connections for fastening the flexible connecting part 40 to the airbag cover region 20 or fastening means which increase the mass of the airbag cover region 20 are therefore less preferred. In addition, in the case of screw connections the danger exists that by the expanding airbag, parts of the screw connection during the striking open of the airbag cover 20 are detached therefrom and can then be thrown around in an uncontrolled manner in the passenger compartment.

According to the embodiment of the interior panel part 1 according to the invention, shown in FIG. 1, the second fastening section 42 of the flexible connecting part 40 embedded in a fastening strip 70 is fastened by means of the fastening strip 70 on the reinforcing ribs 31 of the margin region 32 of the second layer 30. The fastening strip 70 is preferably fastened by means of ultrasonic riveting (not illustrated) on the reinforcing ribs 31. Screw connections or adhesive connections are also conceivable for the fastening of the fastening strip 70 or respectively of the second fastening section 42 of the connecting part 40, mounted therein, on the reinforcing ribs 31. It is essential here that the fastening strip 70 is mounted sufficiently securely on the reinforcing ribs 31 or respectively on the margin region. The fastening strip 70 can also be mounted on the lateral side 30*b* (see FIG. 2) of the reinforcing rib 41, facing the margin region 32, wherein the dimensions of the fastening strip 70 and/or of the reinforcing rib 31 are adapted to one another accordingly, i.e. the projection length of the reinforcing rib 31 can be adapted to the length of the reinforcing strip 70. A mounting of the fastening strip 70 directly on the lateral side 30*b* can be preferred when the coupling section 43 is to act as a hinge.

In the embodiment shown in FIG. 1, the coupling section 43 of the flexible connecting part 40 is constructed as a loop, i.e. the coupling section 43 acts here rather as a rebound strap, because the S-shaped region of the coupling section 43 offers freedom of movement.

It is, however, also possible to construct only the coupling section 43 per se to be flexible and to construct the adjoining fastening sections 41, 42 to be rigid such that the coupling section 43 acts as a film joint or as a hinge or structural joint. This can also be achieved in that the freely movable region of the coupling section 43 is moved closer to the margin region 32, the S-shaped region is shortened, so that the freedom of movement is restricted. The coupling section 43 can be constructed in the corner region between the lateral side 30*b* of the margin region 32 and the airbag inner side 10*a* of the first layer as an L-shaped, flexible section, which then acts similarly to a film joint or hinge when the fastening sections 41, 42 are arranged directly adjacent to this hinge region (not illustrated).

In the embodiment illustrated in FIG. 2, the flexible connecting part 40 is preferably made from a flexible material, woven fabric or knitted fabric, which has the same flexible characteristics and consists of the same material over the range of extent of the first fastening section 41 over the coupling section 43 to the second fastening section 42. The fastening sections 41, 42 can, however also have less flexibility than the coupling section 43. Embodiments of the flexible connecting part 40 are even conceivable, in which the fastening sections 42, 42 are constructed so as to be rigid and only the coupling section 43 has a flexibility such that a joint effect is present on the flexible section and the airbag cover region 20 is only able to be swung open at and via this flexible section. For example, in the rigidly constructed regions of the woven fabric or of the knitted fabric of the connecting part 40, stabilizing or respectively reinforcing wires or plastic rods can be arranged in the fastening sections 41, 42.

In the embodiment illustrated in FIG. 2, the flexible connecting part 40 is a flat web of a textile woven fabric, the flat extension region of which along the direction x1 and x2 corresponds approximately to the course, as illustrated in FIG. 2, and along direction x3 corresponds approximately to the width of the airbag cover region 20 along the direction of the cross-section A-A in FIG. 1. Direction x1, x2, x3 is to be understood to mean respectively the directions which are indicated by the arrows of the coordinate system in FIG. 2.

The flexible connecting part 40 can, however, also consist of individual bands or strips arranged uniformly or non-uniformly parallel to one another, which are arranged respectively with a predetermined distance from one another on the one hand in the airbag cover region 20 on the cover region lower side 10*a* of the first layer 10 and on the other hand on the lower side 30 of the second layer 30. The bands or respectively strips are then arranged in a flatly extending fastening strip 70. The ends of the individual bands or respectively strips can, however, also be received individually in corresponding fastening connection parts, which undertake the function of the fastening strip 70, which are then able to be fastened to the fastening ribs.

In FIGS. 3 to 10 a method is illustrated for the production of the embodiment of the interior panel part 1 shown in FIGS. 1 and 2.

Figure 3:
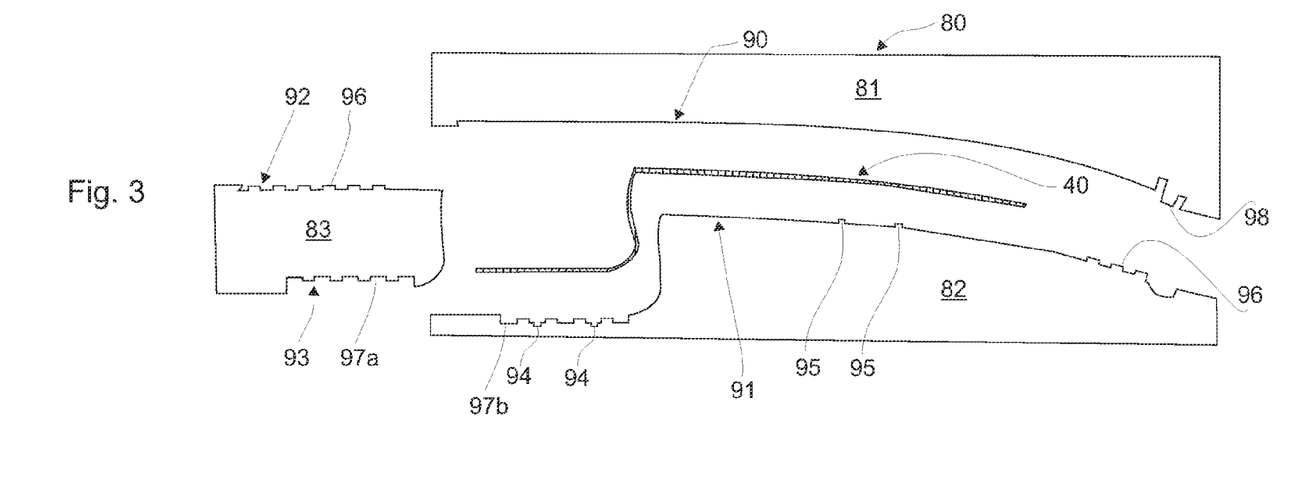
FIG. 3 is a diagrammatic view of a mold in a first step for the production of a first layer and of a fastening strip, which are connected with one another via a flexible connecting part, of the interior panel part according to the invention, according to FIGS. 1 and 2.

In FIG. 3 a mold 80 is shown diagrammatically, which has a first mold part 81, a second mold part 82 and a third mold part 83. Each mold part 81, 82, 83 has respectively on the mold inner side a first contour surface 90, a second contour surface 91, a third contour surface 92 and a fourth contour surface 93, in order to form the first layer 10, shown in FIG. 1, together with the fastening strip 70 on the flexible connecting part 40 for example in an injection molding or pressing method. In the production method which is shown, the first layer 10 and the fastening strip 70 are mounted on the flexible connecting part 40 in an injection molding method. However, other production methods are also conceivable, such as pressing, casting or hot-forming methods. Advantageously, the first layer 10 is produced in an injection molding or pressing method. It is also possible to produce the first layer 10 and the fastening strip 70 in separate molds. Preferably, the fastening strip 70 is firstly mounted on the second fastening section 42 of the flexible connecting part 40 and thereafter in another mold the first layer 10 is mounted on the first fastening section 41 of the flexible connecting part 40, with the mounting methods being able to be respectively an injection molding and/or pressing method.

In FIG. 3 the mold parts 81, 82, 83 are illustrated in an opened position, so that the flexible connecting part 40 can be inserted into the mold 80, in order to provide this with the first layer 10 and the fastening strip 70. As illustrated in FIG. 3, the individual mold parts 81, 82, 83 are provided with the contour surfaces 90, 91, 92 and 93, in order to form the shown configuration features on the first layer 10, such as for example the decorative seam mount 18 and the assembly region 13, and on the fastening strip 70 a plug device 71 and a sequence of webs 73 and grooves 74 assembly region. As illustrated in FIG. 3, female- and male-like structures are formed on the contour surfaces of the respective mold part 81, 82, 83 of the mold 80 in the respective contour surface, so that the cavities formed by closing of the mold parts 81, 82, 83 correspond to the first layer 10 which is to be created and the fastening strip 70. In the first mold part 81 for example on the first contour surface a decorative seam mount contour 98 is formed. Corresponding contour-providing regions and, if necessary, complementary sections are provided in the other mold parts 82, 83, as explained below.

In the first contour surface 90 of the first mold part 81, a decorative strip mount contour 98 is provided as female-like structure for the formation of the decorative strip mount 18 on the first layer 10.

In the second contour surface 91 of the second mold part 82, both contour-providing sections of the cavity of the fastening strip 70 and also contour-providing sections of the cavity of the first layer 10 are formed: a groove-web contour 96 for the assembly region 12 of the first layer, a rib-web contour 97b for the formation of the fastening strip 70 with an additional peg structure 94 for the formation of pins of a plug device 71 (see FIG. 5) on the fastening strip 70. The pins of the plug device 71 are provided for a detachable press fit for assembly in corresponding plug mount devices 16 of the first layer 10. In addition, in the second contour surface 91 of the second mold part 82 of the mold 80 a projection contour 95 is formed for the formation of the plug mount devices 16 of the first layer 10 to receive the pins of the plug device 71.

In the third mold part 83 of the mold 80, in the third contour surface 92 a contour-providing groove-web contour 96 is formed, and in the fourth contour surface 93, facing away from the third contour surface 92, the groove-web contour 97a, corresponding to the groove-web contour 97b, is formed for the formation of the cavity of the fastening strip 70.

Figure 4:
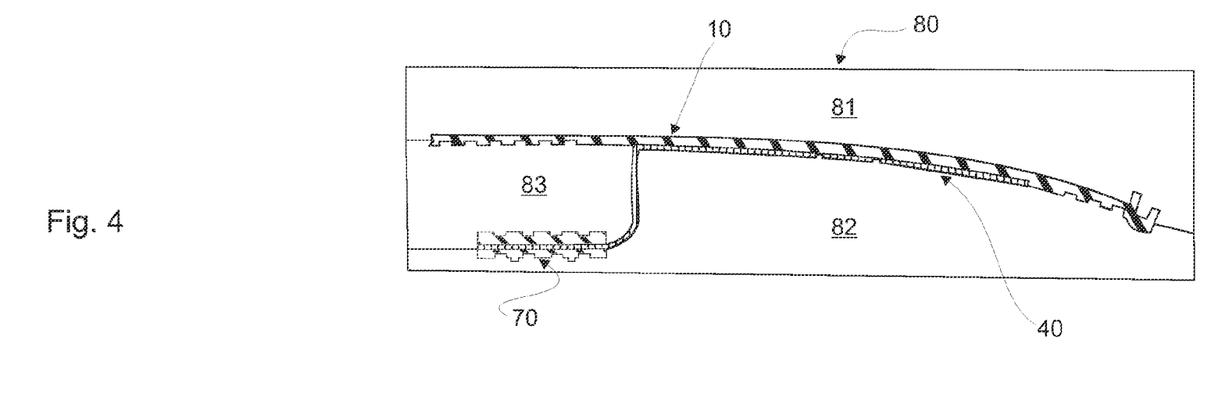
FIG. 4 is a diagrammatic view of a mold in a second step for the production of the first layer, which are connected with one another via a flexible connecting part, of the interior panel part according to FIGS. 1 and 2.

In FIG. 4 an injection molding/pressing method step is shown for the production of the embodiment illustrated in FIG. 2 of the first layer 10, the flexible connecting part 40 and the fastening strip 70. The mold 80 is illustrated in the closed state and on the flexible connecting part 40 the first layer 10 and the fastening strip 70 are already mounted by an injection molding method or by a pressing method on the fastening sections 41 and 42 of the connecting part 40, wherein the coupling section 43 is formed as a loop.

Figure 5:
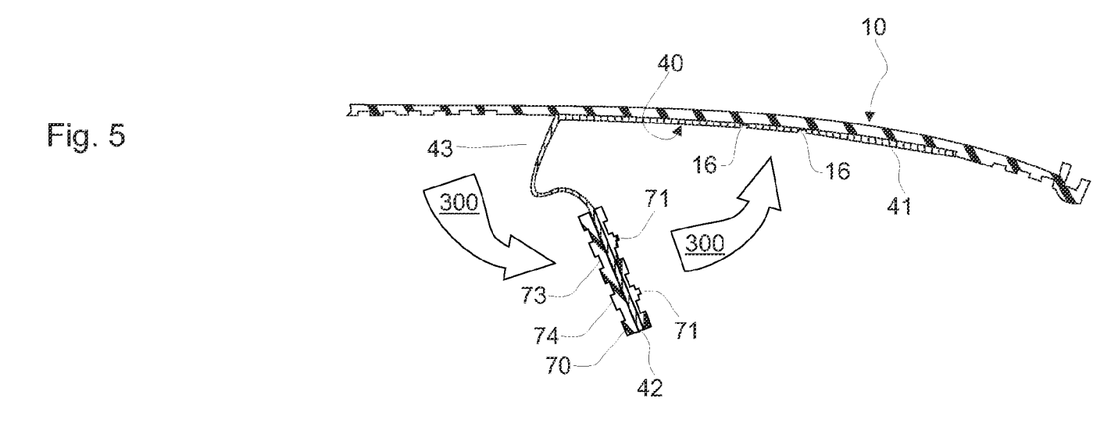
FIG. 5 is a diagrammatic view of the first layer, illustrated in FIGS. 3 and 4, of the interior panel part according to the invention of FIG. 2 in an intermediate assembly step of the fastening strip for the detachable fastening on the first layer of the interior panel part.

In FIG. 5 a preparatory method step is illustrated for the production of the interior panel part 1 shown in FIG. 2. The flexible connecting part 40 is now fastened on the one hand by its fastening section 41 with the first layer 10 and on the other hand by its fastening section 42 on the fastening strip 70. In addition, on one side of the fastening strip 70 plug devices 71 are illustrated, preferably on the side of the fastening strip 70 which in the final assembly state of the fastening strip, as shown in FIG. 2, faces away from the lower side 30a of the second layer 30. This permits the pivot movement of the fastening strip 70, illustrated in FIG. 5 and indicated by the movement arrows 300, to be carried out towards the first fastening section 41 of the flexible connecting part 40, embedded in the first layer 10, without the connecting part having to be turned or twisted in its coupling section 43. This pivot movement, illustrated by the arrows 300, is carried out in order to fasten the fastening strip 70 on the first layer 10, as shown in FIG. 6.

In addition, as illustrated in FIG. 5, plug mount devices 16 are formed in the first layer 10. Preferably, the plug mount devices 16 are recesses or grooves which are dimensioned such that the pins of the plug device 71 of the fastening strip 70 are able to be brought by means of a detachable press fit into engagement with the plug mount device 16 of the first layer 10. In addition, the fastening strip 70 has a sequence of grooves 73 and webs 74. This groove-web structure can facilitate the assembly of the fastening strip 70 on the second layer 30, when the latter has accordingly correspondingly constructed surface structures. In addition, material can be saved hereby, and the second fastening section 42 of the connecting part 40 can be arranged better and more simply centrally in the fastening strip 70.

Figure 6:
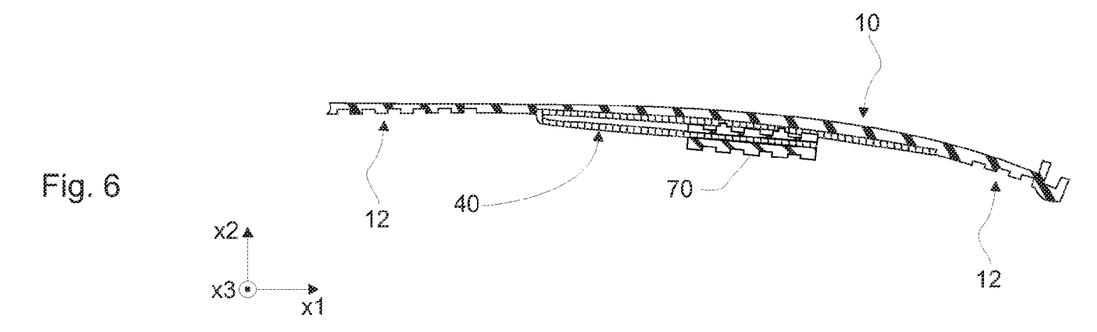
FIG. 6 is a diagrammatic view of the first layer, illustrated in FIGS. 3 and 4, of the interior panel part according to the invention of FIG. 2 in a state in which the fastening strip is detachably fastened to the first layer of the interior panel part.

FIG. 6 illustrates an intermediate assembly step in the production of the interior panel part 1 illustrated in FIG. 2, wherein the fastening strip 70 is fastened by the flexible connecting part 40 on the side of the first layer 10 in a non-destructive manner and detachably, on which also the assembly regions 12 of the first layer 10 are formed. The position of the plug mount device 16 in the first layer 10 is preferably selected such that the coupling section 43 of the flexible connecting part 40 lies substantially flush and slightly taut against the first layer 10, as illustrated in FIG. 6, so that the coupling section 43 can not impede the assembly steps which are still to be carried out.

The non-destructive and detachable assembly of the fastening strip 70 on the first layer 10 takes place by means of inserting the pins of the plug device 71 of the fastening strip 70 into the mounts of the plug mount device 16 of the first layer 10. The plug devices 71 are preferably projections or pins which are constructed in one piece on the fastening strip 70 and which are able to be plugged or inserted into the mounts of the plug mount device 16. The fastening strip 70 mounted on the first layer 10 is held in situ in the plug mount device 16 by the action of a press fit. This means that the dimensions of the plugs of the plug device 71 and the dimensions of the mount of the plug mount device 16 are selected such that the pin of the plug device 71 is able to be inserted into the mount of the plug mount device 16 and is able to be clamped and/or locked into position there.

The plug device 71 can also be formed from separate pins, which after the injection molding process for mounting the fastening strip on the flexible connecting part 40 are mounted at a suitable location, for example by gluing on.

After the fastening strip 70 has been mounted detachably on the first layer 10 with sufficient strength in a non-destructive manner, a protective cap 200 can be mounted on the first layer 10, as illustrated in FIG. 7. The protective cap 200 fulfils a dual function: Firstly, it protects the flexible connecting part 40 from dirt and damage in the subsequent method steps, and secondly is prevents a swinging in of the flexible connecting part 40 into the assembly region 12, 33 of the first layer 10 and of the second layer 30, if the fastening strip 70 were to become detached from the first layer 10 prematurely and inadvertently during the subsequent method steps.

In FIG. 7 the first layer 10 and the second layer 30 are illustrated separated from one another. The movement arrows 400 show a guiding toward one another of the first layer 10 to the second layer 30 in a suitable device or manually by a person. It is essential here that the respective assembly region 12 of the first layer 10 and the respective assembly region 33 of the second layer 30 are aligned and arranged correctly one over another, i.e. the toothings of the first layer 10 and of the second layer 20 engage into one another correctly. The toothings formed by the assembly regions 12, 13, owing to the sequence of webs 14, 34 and grooves 15, 35, also offer a positioning aid for the correct positioning of the first layer 10 on the second layer 30.

Figure 8:
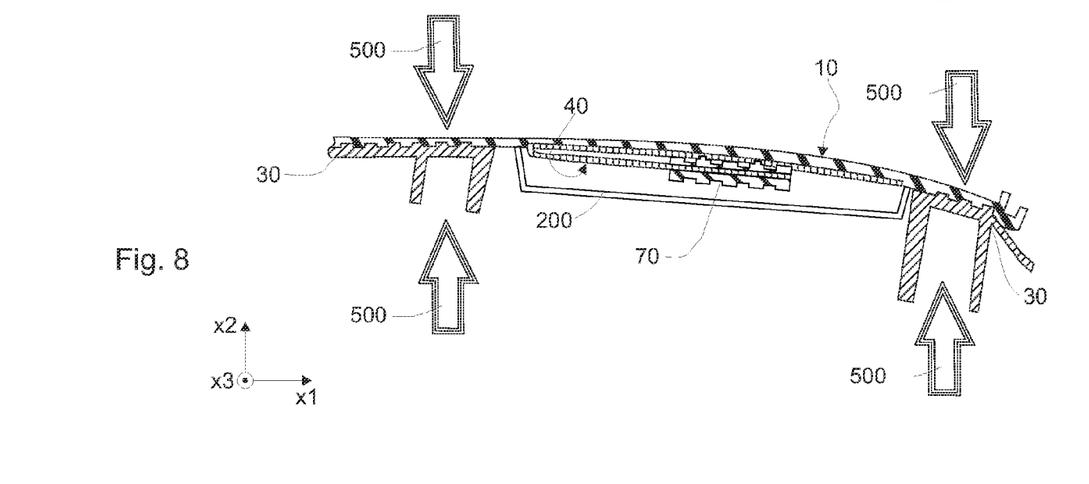
FIG. 8 is a diagrammatic view of the first and second layer, illustrated in FIGS. 3 and 4, of the interior panel part according to the invention, wherein the first layer with the second layer are mounted on one another in a fastening method.

In FIG. 8 the fastening of the first layer 10 onto the second layer 30 by vibration welding is illustrated diagrammatically This is indicated by the vibration arrows 500, which are intended to symbolize an application of a vibration pressure in direction x3 (in arrow directions of x3) and in the opposite direction x3 (opposed to the arrow direction of x3). The surfaces of the grooves 15, 35 and webs 14, 34 are pressed onto one another and vibrated by the vibration pressure such that the assembly regions 12, 13, which are in engagement, of the first layer 10 and of the second layer 30 are surface-fused, so that both assembly regions 12, 33 are connected with one another permanently. A predetermined vibration pressure is preferably applied in a frequency range of 85 Hz on the assembly regions 12 and 33.

Other fastening and joining methods can also be used for fastening the first layer 10 on the second layer 20. The following are named here in addition, by way of example: ultrasonic welding, heated tool welding, infra-red welding, hot gas welding, spot welding, friction welding, high frequency welding, circular welding or laser beam welding. In particular, fastening methods are able to be used which are suitable for the permanent connecting of the first and second layer 10, 30, in which the plastics and materials used of the two layers 10, 30 are not negatively impaired.

Figure 9:
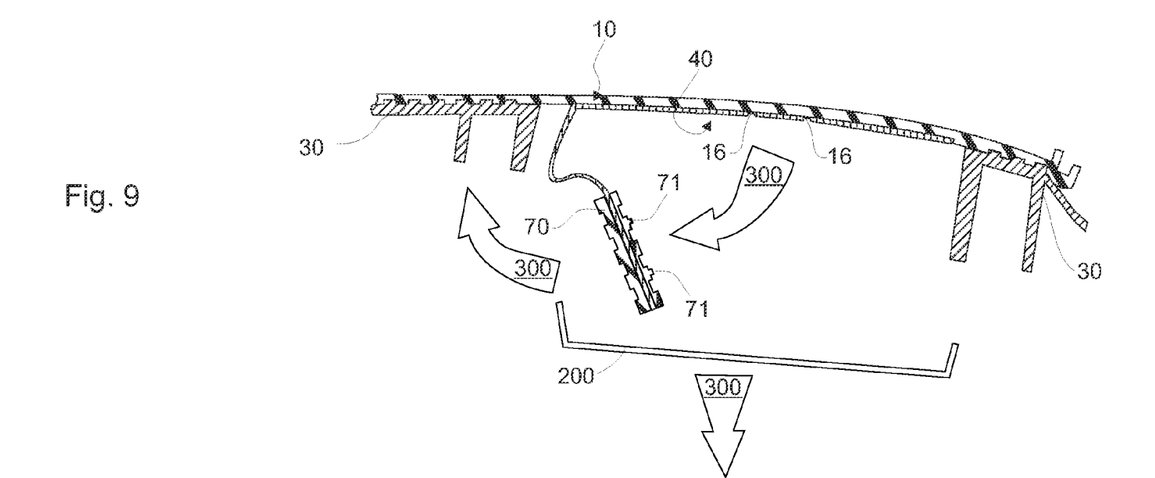
FIG. 9 is a diagrammatic view of the first and second layer, illustrated in FIGS. 3 and 4, of the interior panel part according to the invention, on the desired dismantling of the fastening strip from the first layer.

As can be seen from FIG. 9, the first layer 10 and the second layer 10, 30 are now fastened to one another by the previously applied joining or fastening method, and already the detachable and non-destructive dismantling of the fastening strip 70 from the first layer 10 and the eliminating of the protective cap 200 has begun, as indicated by the arrows 300. It is important here that both the fastening strip 70 and also the protective cap 200 have been mounted on the first layer 10 such that they cannot become detached during the fastening method which is used, and nevertheless can be eliminated from the first layer 10 in a non-destructive manner, as indicated in FIG. 9.

Figure 10:
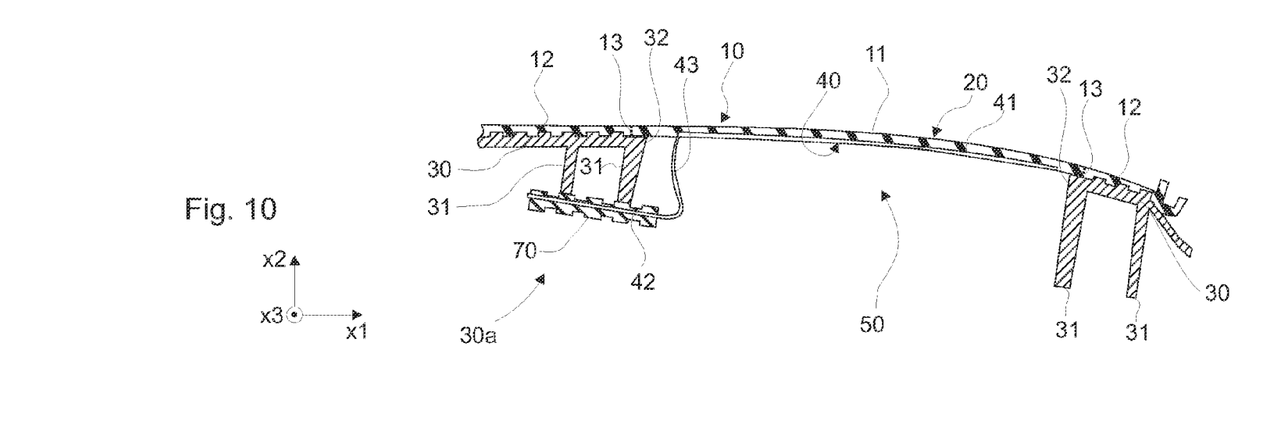
FIG. 10 is a diagrammatic view of the first and second layer, illustrated in FIGS. 3 and 4, of the interior panel part according to the invention, wherein the fastening strip is fastened to a lower side of the second layer.

In FIG. 10 the interior panel part 1 is illustrated in its final state. The fastening strip 70 is fastened to the reinforcing ribs 31. Ultrasonic riveting is regarded here as the preferred fastening method. The fastening strip 70 can, however, also be fastened by screw connections or other fastening methods, such as gluing, screwing and/or welding methods, on the lower side 30a of the second layer 30. The plug connection 71 and the plug mount device 16 can be eliminated, as illustrated in FIG. 10, in which these are correspondingly separated or filled.

Figure 11:
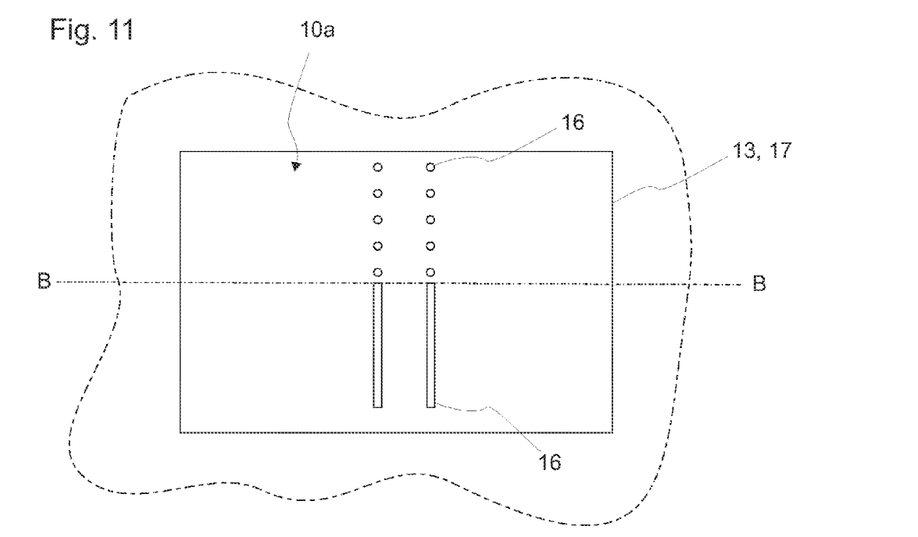
FIG. 11 is a diagrammatic bottom view of the airbag cover region illustrated in FIGS. 1 and 2, wherein only the outline of the airbag cover region and the position of mounts of the first layer of a first and of a second embodiment are illustrated of plug connectors, provided on the fastening strip, for assembly in the mounts of the first layer.
Figure 12:
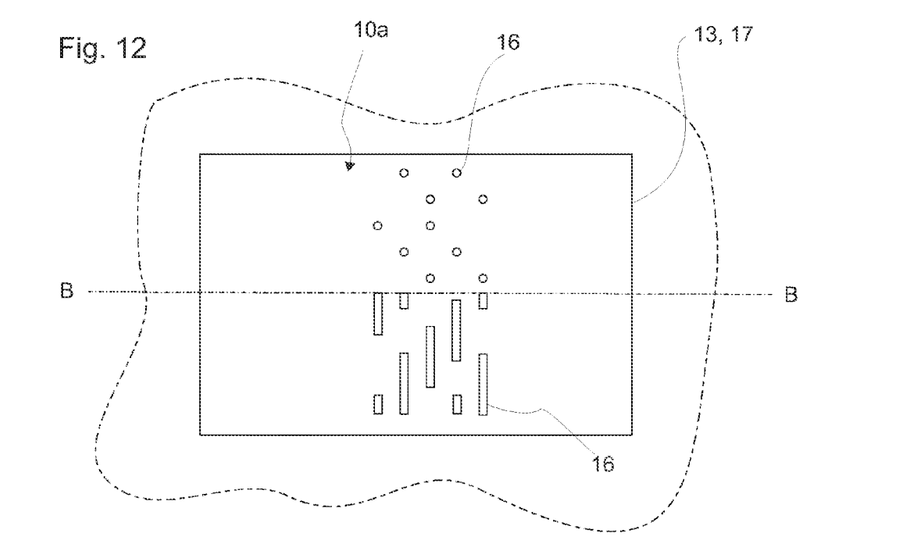
FIG. 12 is a diagrammatic bottom view of the airbag cover region illustrated in FIGS. 1 and 2, wherein only the outline of the airbag cover region and the position of mounts of the first layer of a third and of a fourth embodiment are illustrated of plug connectors, provided on the fastening strip, for assembly in the mounts of the first layer.

FIGS. 11 and 12 show in a simplified bottom view of the airbag cover region 20 diagrammatically possible embodiments of the coupling device or respectively plug mount device 16 of the first layer 10, which can be formed in the cover region lower side 10a of the first layer 10, wherein the different embodiments are illustrated separated from one another according to FIGS. 11 and 12 by the reference line B-B in mirror image. In FIG. 11, as a first embodiment the plug mount device 16 is illustrated as a plurality of recesses with a circular opening edge. The recesses are arranged parallel to one another and in series. On the opposite side of the reference line B-B a second embodiment of the plug mount 16 is illustrated, which is formed by channels or grooves arranged parallel to one another.

In FIG. 12 the plug mounts shown in FIG. 11 are arranged offset with respect to one another.

The embodiments of the plug mount device 16 illustrated in FIGS. 11 and 12 are designed such that the plug devices 71 provided on the fastening strip 70 can be retained for example by the action of a press fit therein. For this, either the elements of the plug devices 71 have a slight excess, or the elements of the plug mount device 16 of the associated plug devices 71 have a slight undersize, or vice versa The distribution of the elements of the plug mount device 16, illustrated in the bottom view, in the first layer 10 is constructed in a manner corresponding to the distribution of the elements of the plug devices 71 of the fastening strip 70. In another embodiment of the interior panel part 1 according to the invention, the elements of the plug device 71 of the fastening strip 70 can be formed on the first layer 10, wherein the corresponding elements of the plug mount device 16 in this case are provided on the fastening strip 70.

A preferred method for the production of the interior panel part 1, shown in FIG. 2, is described below with reference to FIGS. 3 to 10.

As shown in FIG. 3, the flexible connecting part 40 is inserted into an opened mold 80 in the correct position. The mold parts 81, 82, 83 of the mold 80 are then closed such that the cavities are produced for forming the first layer 10 and the fastening strip 70. When the cavities are properly formed, plastic is injected into the cavities, wherein the final state of the injection step is illustrated in FIG. 4. The first layer 10 and the fastening strip 70 can also be formed in separate injection processes, wherein preferably firstly the fastening strip 70 and thereafter the first layer 10 are injected onto the flexible connecting part 40. After the injection step, the flexible connecting part 40 together with the first layer 10 and the fastening strip 70 is removed from the mold 80. Then, as illustrated in FIGS. 5 and 6, the fastening strip 70 is mounted detachably by means of its plug device 71 on the first layer 10 in the plug mount devices 16 thereof. In the next step, a protective cap 200 is mounted over the region of the fastening strip 70 which is mounted on the first layer 10. Before or after the mounting of the protective cap 200, the first layer 10 can be provided with a material weakening 13 at the sites indicated in FIGS. 1 and 2. A material weakening 13 means here the reduction in the rigidity by the removal of material, so that at the site of the material weakening the airbag cover can be torn open by an expanding airbag. Preferably, the material weakening takes place in a laser method.

After the assembling of the fastening strip 70 and of the protective cap 200 on the first layer 10, the mounting of the second layer 20 onto the first layer 10 takes place. The second layer 20 was previously produced here in a similar injection molding or pressing method and prepared for the permanent connection with the first layer 10. Then the two layers 10, 20 are arranged one over another such that the assembly regions 12, 33 of the first layer 10 or respectively of the second layer 30 are in engagement with one another in an accurately fitting manner, as shown in FIGS. 7 and 8. Then by applying a vibration pressure with approximately 85 Hz, a vibration welding step is carried out, in order to fasten the assembly regions 12, 33 with one another. However, other fastening and joining methods are also able to be used, such as for example: ultrasonic welding, heated tool welding, infra-red welding, hot gas welding, spot welding, friction welding, high frequency welding, circular welding and/or laser beam welding. For fastening the assembly regions 12, 33 of the first layer 10 or respectively of the second layer 30, joining methods are preferred which are suitable for the permanent connecting of plastics.

After the fastening of the first layer 10 on the second layer 30, the protective cap 200 is eliminated and the fastening strip 70 is brought out of engagement from the first layer 10, in which the plug devices 17 of the fastening strip are detached in a non-destructive manner from the plug mount devices 16 of the first layer 10. Finally, the fastening strip 70 at the position illustrated in FIG. 10 on the margin region 32 is mounted on one or on both reinforcing ribs 31 of the second layer 20 by ultrasonic riveting. The fastening of the fastening strip 70 on the second layer 20 can also take place by a different fastening and joining method, such as gluing, welding or by screw connections.

After this, a decorative layer can be applied on the interior panel part 1, illustrated in FIG. 10, on the first layer 10. The decorative layer can be a layer of a knitted fabric or foam, on which a leather or slush skin can be provided.

The invention claimed is:

1. An interior panel part for the interior of a vehicle, having a first layer facing a first side and a second layer which is formed as a support layer and which is fastened to the first layer and comprises a lower surface which faces a second side situated opposed to the first side, wherein the second layer comprises an encircling margin region and an airbag passage opening defined thereby, wherein the first layer comprises a main region covering the encircling margin region and an airbag cover region covering the passage opening and is embodied such that the airbag cover region is able to be at least partially separated from the main region by an airbag expanding from the second side,
wherein the interior panel part has a connecting part which is formed from:
a first fastening section which is fastened to the airbag cover region of the first layer;
a second fastening section which is mounted to a fastening strip, wherein at least one reinforcing rib is formed at the second layer and extends at the second side, and wherein the fastening strip is fastened to the lower surface of the second layer; and
a coupling section situated between the first fastening section and the second fastening section, which is made of flexible material and embodied such that the airbag cover region after its at least partial separation from the main region is held by the coupling section.

2. The interior panel part according to claim 1, characterized in that the first fastening section and the second fastening section are spaced apart from one another such that the coupling section is constructed between the two fastening sections as an exposed section, in particular a loop.

3. The interior panel part according to claim 2, characterized in that a first coupling device of the fastening strip is a plug device and a second coupling device of the first layer is a plug mount device, or vice versa, which together form a detachable press fit.

4. The interior panel part according to claim 3, characterized in that the plug device has plug-in pins or plug-in strips which are arranged in series, linearly, parallel and/or offset with respect to one another, wherein the plug mount device is provided at a corresponding position.

5. The interior panel part according to claim 1, characterized in that the first fastening section and the second fastening section are spaced apart from one another such that the coupling section is constructed as a film joint or hinge joint.

6. The interior panel part according to claim 1, characterized in that the second fastening section of the connecting part is embedded in the fastening strip.

7. The interior panel part according to claim 6, characterized in that the fastening strip is provided with a first coupling device and the first layer is provided with a second coupling device, corresponding thereto, for the detachable force-fitting and/or form-fitting coupling with one another of the fastening strip to the first layer.

8. The interior panel part according to claim 1, characterized in that the fastening strip is mounted on the at least one reinforcing rib.

9. The interior panel part according to claim 1, characterized in that the connecting part is formed from a netlike woven fabric or knitted fabric, which has a sufficient resistance to tearing.

10. The interior panel part according to claim 1, characterized in that the first layer to the side of the airbag cover region has a first assembly region for assembly with the second layer, wherein the second layer at the margin region to the airbag passage opening has a second assembly region complementary to the first assembly region of the first layer.

11. The interior panel part according to claim 10, characterized in that the first assembly region of the first layer has a first sequence of a groove and a web, and that the second assembly region of the second layer has a second sequence of a groove and a web, which are arranged offset with respect to one another such that a groove of the one layer is associated with a web of the other layer.

12. The interior panel part according to claim 1, characterized in that the margin region is reinforced by the at least one reinforcing rib.

13. The interior panel part according to claim 1, characterized in that the first and second layer are constructed from a plastic material.

14. The interior panel part according to claim 1, characterized in that the airbag cover region is defined at least partially by a material weakening in the first layer.

* * * * *